United States Patent
Kadinger et al.

(10) Patent No.: US 6,964,077 B2
(45) Date of Patent: Nov. 15, 2005

(54) PIPE CLEANING AND DEBURRING TOOL

(75) Inventors: Kelly K. Kadinger, Menomonie, WI (US); Theodore Schonebaum, Clear Lake, WI (US)

(73) Assignee: Red Cedar Plastics, LLC, Menomonie, WI (US)

( * ) Notice: Subject to any disclaimer, the term of this patent is extended or adjusted under 35 U.S.C. 154(b) by 74 days.

(21) Appl. No.: 10/412,818

(22) Filed: Apr. 14, 2003

(65) Prior Publication Data

US 2004/0200018 A1    Oct. 14, 2004

(51) Int. Cl.$^7$ .............................. F16L 45/00; B08B 9/02
(52) U.S. Cl. ............................... 15/104.03; 15/104.04; 15/104.05; 15/104.09; 15/106; 451/462
(58) Field of Search .................... 15/104.03, 104.04, 15/104.05, 104.09, 104.095, 179, 176.1, 15/176.6, 105–106; 451/461, 462, 180; 411/520–521, 411/525–526

(56) References Cited

U.S. PATENT DOCUMENTS

| | | | |
|---|---|---|---|
| 3,076,988 A | | 2/1963 | Mills |
| 4,246,728 A | | 1/1981 | Leasher |
| 4,301,567 A | * | 11/1981 | Tucker ..................... 15/160 |
| 4,678,380 A | | 7/1987 | Zahuranec et al. |
| 5,038,525 A | | 8/1991 | Gardner |
| 5,058,327 A | | 10/1991 | Buchanan |
| 5,168,660 A | | 12/1992 | Smith |
| 5,269,104 A | | 12/1993 | DiBiagio |
| 5,307,534 A | | 5/1994 | Miller |
| 5,791,005 A | | 8/1998 | Grabowski et al. |
| 6,299,518 B1 | | 10/2001 | Daggett |
| 6,393,645 B1 | | 5/2002 | Kadinger |
| 6,578,228 B2 | * | 6/2003 | Yehia ...................... 15/104.04 |
| 2002/0095735 A1 | | 7/2002 | Yehia |
| 2003/0172481 A1 | * | 9/2003 | Yehia ...................... 15/104.04 |

FOREIGN PATENT DOCUMENTS

GB      2 147 835      *   5/1985

* cited by examiner

*Primary Examiner*—John Kim
*Assistant Examiner*—Laura C Cole
(74) *Attorney, Agent, or Firm*—Stiennon & Stiennon

(57) ABSTRACT

A plastic housing has a front shell with inwardly protruding bristles of an exterior wire brush, and a rear shell which retractably receives the outwardly protruding bristles of an interior wire brush. The interior brush is mounted to a shaft which engages the housing, and which is driven by a motor, such as by a power drill. A ring-like deburring element is mounted to the shell between the front shell and the rear shell, and has an inwardly and frontwardly protruding generally frustoconical first wall forming a deburring element which defines a central opening through which the interior brush may be projected and retracted. The first wall may be planar segments, or may have a circular cross section. The deburring element serves to position a pipe for burnishing by the exterior brush, and also deburrs the end of the inserted pipe.

17 Claims, 2 Drawing Sheets

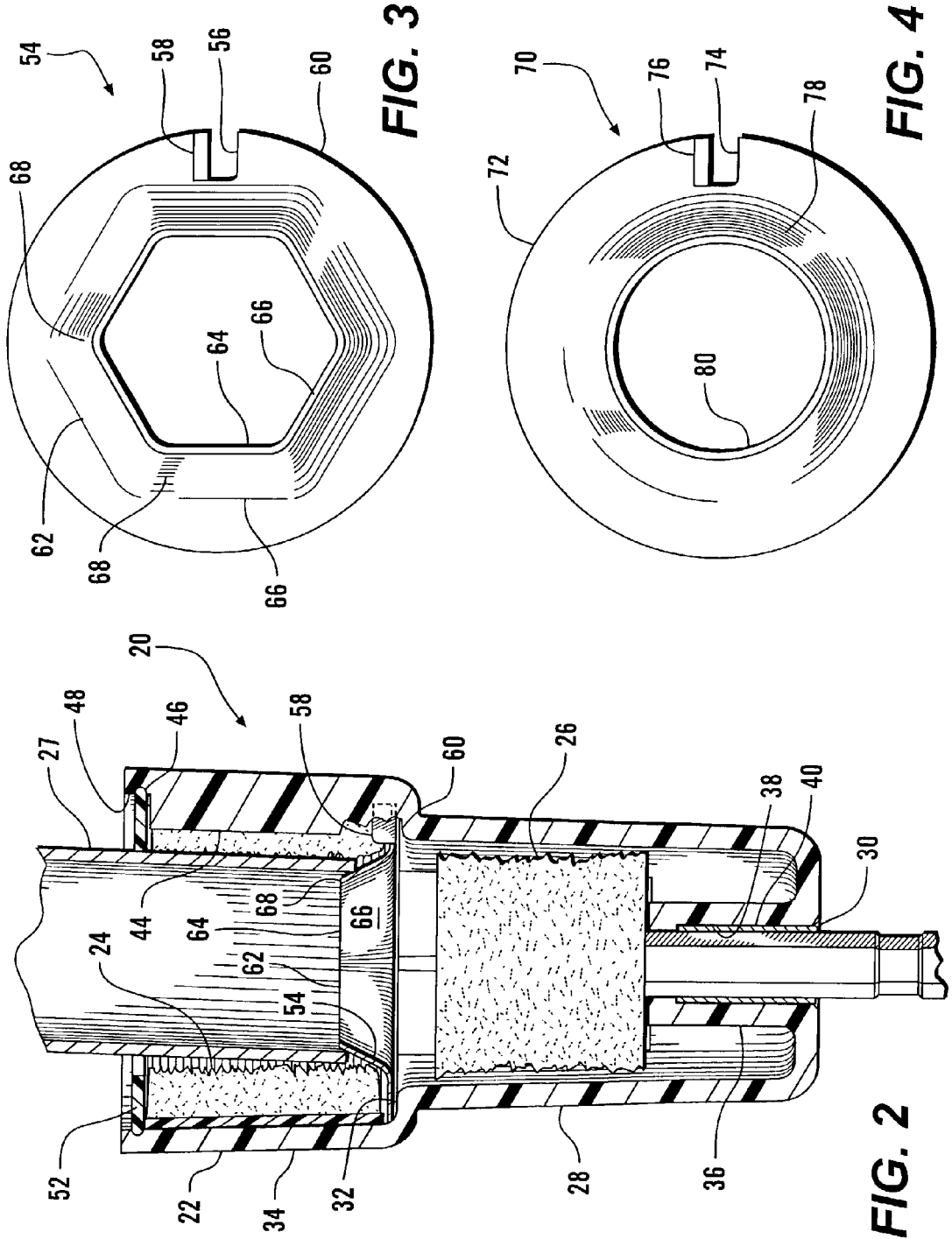

PIPE CLEANING AND DEBURRING TOOL

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to apparatus for treating the cut ends of pipes and fittings.

The exposed portions of copper and brass pipes and fittings are subject to corrosion and contamination which can interfere with the action of surface tension which draws solder or braze alloy into contact when the pipes or fittings are soldered or brazed together. Thus it is required to clean the pipe surfaces which are to be joined. Moreover, in some applications it is required to remove the projecting burrs of copper or brass before joining the pipes. Although many tools are available to perform the burnishing of a pipe interior or exterior, or to deburr a pipe, convenience and ready availability of all necessary tools can speed along the process of preparing multiple pipe surfaces. What is needed is an economical tool which provides convenient burnishing and deburring of pipes and fittings.

SUMMARY OF THE INVENTION

The pipe burnishing and deburring tool of this invention has a plastic housing with a cylindrical front shell joined by a flange to a rear shell of narrower diameter. An exterior wire brush with inwardly protruding bristles is mounted within the front shell. And an interior wire brush is mounted on a shaft which is retractable from an active position within the front shell, to a inactive position within the rear shell. The interior brush is mounted to a shaft which is keyed to the housing to cause the housing to turn with the shaft but allow the housing to slide on the shaft to bring the interior brush into engagment. The shaft is driven by a motor, typically a power drill. A ring-like deburring element is mounted to the shell on a flange defined between the front shell and the rear shell, and has an inwardly and frontwardly protruding wall which defines a central opening through which the interior brush may be projected and retracted. The ring-like deburring element may be formed of planar segments joined to form a ring, or may be frustrocontical. The deburring element serves to position a pipe for cleaning by the exterior brush, and also serves to deburr the end of the inserted pipe.

It is a feature of the present invention to provide a single tool which may serve to burnish the exterior or interior of a pipe, and to deburr the end of the pipe.

It is another feature of the present invention to provide a pipe burnishing and deburring tool which is economically fabricated.

It is a further feature of the present invention to provide a tool which centers a pipe to be treated within a burnishing exterior brush.

Further features, and advantages of the invention will be apparent from the following detailed description when taken in conjunction with the accompanying drawings.

BRIEF DESCRIPTION OF THE DRAWINGS

FIG. 2 is a cross-sectional view of the tool of FIG. 1.

FIG. 3 is a top plan view of the deburring element of the tool of FIG. 2.

FIG. 4 is a top plan view of an alternative embodiment deburring element of the pipe burnishing and deburring tool of this invention.

DESCRIPTION OF THE PREFERRED EMBODIMENTS

Figure 1:
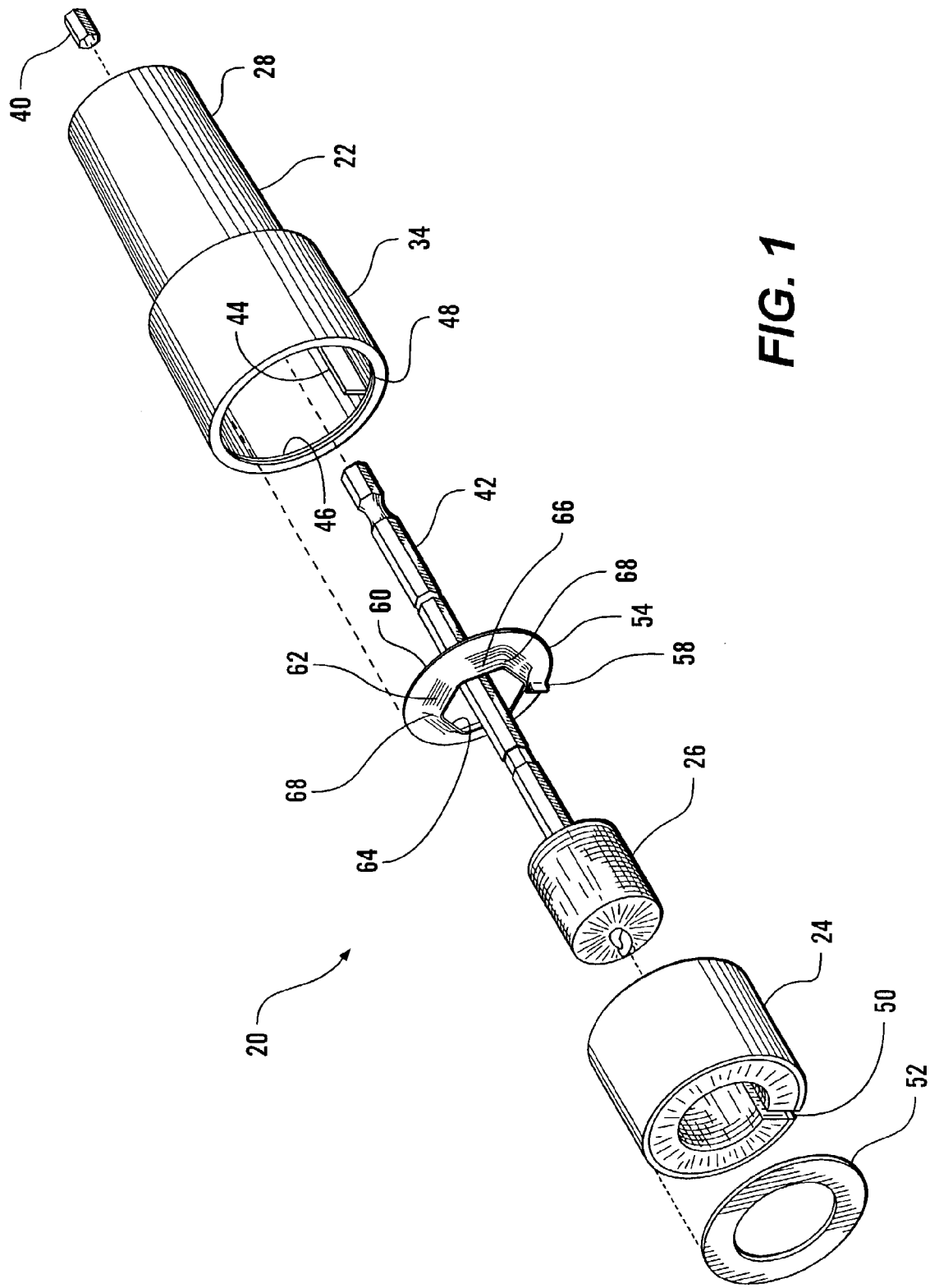
FIG. 1 is an exploded isometric view of the pipe burnishing and deburring tool of this invention.

Referring more particularly to FIGS. 1–4 wherein like numbers refer to similar parts, a pipe burnishing and deburring tool 20 is shown in FIG. 1 and FIG. 2. The tool 20 has a housing 22, preferably formed of molded plastic material, for example polycarbonate. As shown in FIG. 1, an exterior wire brush 24 and an interior wire brush 26 are mounted within the housing 22 for the burnishing of the exterior or interior of a pipe segment 27 respectively.

The housing 22, as best shown in FIG. 2, has a rear shell 28 which extends frontwardly from a rear opening 30 to a radially outwardly protruding radial flange 32 which adjoins a frontwardly extending front shell 34 which is coaxial with the rear shell and of greater diameter. A shaft tube 36 extends frontwardly from the rear opening 30 and defines a non-round shaft passage 38 which receives a roughly hexagonal metal bushing 40. The interior brush 26 has a rearwardly extending non-round shaft 42 which is keyed to the shaft tube to cause the housing 22 to rotate with the shaft 42. The shaft 42 extends through the metal bushing 40 rearwardly of the housing 22 and is connected to an electric motor, not shown, such as a conventional electric power drill.

The interior brush 26 is movable when the housing is not rotating by sliding the shaft 42 to which the brush 26 is mounted axially on the bushing 40, between a retracted position within the rear shell 28, such as shown in FIG. 2, and an active position within the front shell 34 where the interior brush 26 can burnish the interior of an inserted pipe 27 or fitting. When the shaft 42 is rotating the spring bushing 40, as explained below, operates to hold the housing fixed with respect to the shaft. Alternatively, a set screw may be used. A keying member 44 extends radially inwardly from the front shell and extends frontwardly from the flange 32 to a peripheral retention ring groove 46 near the front opening 48 of the front shell 34. In FIG. 2, the keying member is shown partially broken away adjacent the flange 32.

The exterior brush 24, as shown in FIG. 1, is a rectangular sheet of wire brush material which is formed into a cylindrical element and inserted within the front shell such that the bristles of the brush 24 extend radially inwardly. The gap 50 between the two ends of the wire brush material coincides with the keying member 44 to prevent the rotation of the exterior brush 24 with respect to the housing 22. The exterior brush 24 is prevented from escaping frontwardly through the front opening 48 of the front shell 34 by a plastic annular retention ring 52 which is received within the peripheral groove 46.

A deburring element 54 is supported on the flange 32 within the front shell 34. The deburring element 54, as shown in FIG. 3, has an alignment slot 56 through which the front shell keying member 44 extends to cause the deburring element to rotate with the housing 22. A frontwardly projecting flange 58 extends adjacent the alignment slot 56 and abuts the keying member 44. The frontwardly projecting alignment flange 58 distributes the torque by the deburing action of the deburring element to the keying member 44 thus preventing the edges of the alignment slot from cutting in to the keying member 44. The deburring element 54 is preferably formed as a steel matched die stamping. The steel may be nickle plated or galvanized prior to stamping. The deburring element 54 has a circular base ring 60 with a generally frustoconical first wall 62 which extends frontwardly and radially inwardly from the base ring. The first wall 62 terminates in a front edge 64 which defines the opening through which the interior brush may be extended. The deburring element 54 first wall 62 engages against an inserted pipe to remove any inwardly protruding burrs from the pipe segment. The steel of the deburring element 54 is preferably about 0.020 to 0.025 inches thick. The first wall 62 preferably extends from a radial plane coinciding with the base ring 60 at an angle of about 45° to about 80°, and more preferably at about 70°.

As best shown in FIG. 3, the frontwardly and inwardly extending first wall of the deburring element may be formed as a series of wall segments 66, each approximately planar. The intersecting planar segments create a plurality of projections 68 where the wall segments 66 meet. The projections 68, being the radially outermost portions of the deburring element, will be those portions which engage and remove the burrs. The first wall 62 may be made with six segments as shown in FIG. 3, or a greater or lesser number of segments. Each planar segment of the first wall has a first edge which adjoins the base ring, and two spaced second edges which extend frontwardly from the base ring, wherein each planar segment second edge extends along the second edge of an adjoining planar segment to define the projections 68. Alternatively, as shown in FIG. 4, a deburring element 70 may have a base ring 72 with an alignment slot 74 and a frontwardly projecting alignment flange 76, such as those shown in the deburring element 54, but may have a first wall 78 which has no projections and is substantially frustoconical, having a circular cross section, with a circular inner edge 80.

Because the tool 20 may be made to different dimensions to treat different pipe diameters, the deburring element also may vary in size. For example, a deburring element 54 configured for treatment of a pipe with a three-quarter-inch diameter may have a base ring approximately 1.5 inches in diameter, a first wall about 0.87 inches in diameter, and a inside opening about 0.73 inches in diameter.

In use, the deburring element 54 serves not only to remove burrs from the interior of a pipe segment 27, but also helps to center the tool 20 with respect to the axial pipe segment being treated. When it is desired to burnish the exterior of a pipe segment 27 and to remove burrs from the end of that segment, the interior brush 26 is retracted within the rear shell 28 and the entire tool is rotated on the shaft 42 of the interior brush 26. Because the shaft 42 is locked against rotation with respect to the housing 22 by the engagement between the hexagonal shaft 42 and the roughly hexagonal bushing 40, the entire tool will rotate when the shaft is rotated by, for example, a power drill. The hexagonal bushing 40 is folded from a single sheet of metal, and has two sides which are not adjacent and not opposite which are slightly longer than the remaining four sides. Between the longer sides a third side is defined which has a protrusion which extends into the hexagonal opening defined by the bushing 40 and opposite the third side is a fourth side along the middle of which the two edges of the single sheet of metal are brought together. This bushing 40 has the property that when the housing is not spinning, the housing can easily be easily slid along the shaft 42, but when the shaft is spinning the housing is locked against sliding. When it is desired to burnish the interior of a pipe segment 27, for example on a pipe fitting, the interior brush 26 is extended, while the housing is not rotating, past the front shell 34. Once past the front shell, the interior brush 26 is rotated within the interior of the pipe fitting.

It is understood that the invention is not limited to the particular construction and arrangement of parts herein illustrated and described, but embraces all such modified forms thereof as come within the scope of the following claims.

We claim:

1. A pipe tool comprising:
   a housing having a rear shell, and a front shell which extends frontwardly from the rear shell, portions of the rear shell defining a rear opening;
   an interior brush mounted to a shaft, and having a plurality of radially outwardly protruding bristles, the shaft extending rearwardly through the housing rear opening, the housing being movable axially along the shaft to alternatively position the interior brush in a retracted position retained within the rear shell, and an active position forward of the front shell;
   an exterior brush mounted within the housing front shell, and having a plurality of bristles which extend inwardly from the front shell; and
   a deburring element positioned between the front shell and the rear shell, and having a central opening, wherein bristles of the interior brush pass through the deburring element central opening when the interior brush is moved between the retracted position and the active position, the deburring element having a first wall which protrudes frontwardly from a base ring which extends substantially within a plane and radially inwardly, and the first wall forming a front edge which defines the deburring element central opening.

2. The tool of claim 1 wherein the first wall has substantially a circular cross section.

3. The tool of claim 1 wherein the first wall is comprised of a plurality of generally planar segments.

4. The tool of claim 1 wherein the deburring element first wall extends from the base ring at an angle of about 45° to about 80°.

5. The tool of claim 4 wherein the deburring element first wall extends from the base ring at an angle of about 70°.

6. A pipe tool of the type having a housing with a rear shell, and a front shell which extends frontwardly from the rear shell, a radially outwardly extending flange being defined between the front shell and the rear shell, and an interior brush mounted to a shaft, and having a plurality of radially outwardly protruding bristles, the shaft extending rearwardly through the housing, the housing being movable axially along the shaft to alternatively position the interior brush in a retracted position retained within the rear shell, and an active position forward of the front shell, and an exterior brush mounted within the housing front shell, and having a plurality of bristles which extend inwardly from the front shell, wherein the improvement comprises:
   a deburring element having a base ring which extends substantially within a plane which is positioned adjacent the flange, and having a central opening, wherein bristles of the interior brush pass through the deburring element central opening when the interior brush is moved between the retracted position and the active position, the deburring element having a first wall which protrudes frontwardly from the base ring and radially inwardly from the base ring, and the first wall has a front edge which defines the deburring element central opening.

7. The tool of claim 6 wherein the first wall has a substantially circular cross section.

8. The tool of claim 6 wherein the first wall is comprised of a plurality of generally planar segments.

9. The deburring element of claim 8 wherein each planar segment of the first wall has a first edge which adjoins the base ring, and two spaced second edges which extend frontwardly from the base ring, wherein each planar segment second edge extends along the second edge of an adjoining planar segment.

10. The tool of claim 6 wherein the first wall extends from the base ring at an angle of about 45° to about 80°.

11. The tool of claim 10 wherein the deburring element first wall extends from the base ring at an angle of about 70°.

12. A pipe tool comprising:
a housing having a front shell;
an exterior brush mounted within the housing front shell, and having a plurality of bristles which extend inwardly from the front shell; and
a deburring element positioned within the housing, and having a central opening, the deburring element having a base ring which extends substantially within a plane, and a first wall which protrudes frontwardly from the base ring and radially inwardly from the front shell, the first wall forming a front edge which defines the deburring element central opening, the base ring extending radially outwardly from the first wall, wherein the deburring element first wall extends from the base ring at an angle of about 45° to about 80°.

13. The tool of claim 12 wherein the first wall is comprised of a plurality of generally planar segments.

14. The deburring element of claim 13 wherein each planar segment of the first wall has a first edge which adjoins the base ring, and two spaced second edges which extend frontwardly from the base ring, wherein each planar segment second edge extends along the second edge of an adjoining planar segment.

15. A deburring element for a pipe cleaner comprising:
a base ring extending substantially within a plane,
a first wall which protrudes frontwardly and inwardly from the base ring, to define a central opening, the first wall being comprised of a plurality of planar segments which extend from the base ring at an angle of about 45° to about 80°, wherein each planar segment of the first wall has a first edge which adjoins the base ring, and two spaced second edges which extend frontwardly from the base ring, wherein each planar segment second edge extends along the second edge of an adjoining planar segment.

16. A pipe tool comprising:
a housing having a front shell, and a rearward flange within the front shell;
a keying member within the housing front shell which extends radially inwardly from the front shell, and portions of the front shell extend frontwardly from the front shell rearward flange;
an exterior brush mounted within the housing front shell, and having a plurality of bristles which extend inwardly from the front shell; and
a deburring element positioned within the housing, and having a central opening, the deburring element having a base ring which engages the rearward flange, and a first wall which protrudes frontwardly from the base ring and radially inwardly from the front shell, the first wall forming a front edge which defines the deburring element central opening, the deburring element base ring having portions which define a slot through which the keying member protrudes.

17. The pipe tool of claim 16 wherein the deburring element first wall is comprised of a plurality of planer segments which extend from the base ring at an angle of about 45° to about 80°.

* * * * *